United States Patent
Noh et al.

(10) Patent No.: US 8,467,836 B2
(45) Date of Patent: Jun. 18, 2013

(54) METHOD AND APPARATUS FOR TRANSMITTING DATA IN WIRELESS COMMUNICATION SYSTEM

(75) Inventors: Seung Pyo Noh, Seoul (KR); Yong Sang Cho, Seoul (KR); Joung Youl Kim, Seongnam-si (KR); Seung Hwan Jang, Seoul (KR); Ki Hwan Kim, Goyang-si (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 12/962,538

(22) Filed: Dec. 7, 2010

(65) Prior Publication Data

US 2011/0143699 A1    Jun. 16, 2011

Related U.S. Application Data

(60) Provisional application No. 61/285,521, filed on Dec. 10, 2009.

(30) Foreign Application Priority Data

Dec. 29, 2009  (KR) .................. 10-2009-0132285
Oct. 29, 2010  (KR) .................. 10-2010-0106970

(51) Int. Cl.
*H04B 1/04*    (2006.01)
(52) U.S. Cl.
USPC ............ 455/574; 455/39; 455/127.1; 307/43; 307/45; 307/46; 307/64; 307/66
(58) Field of Classification Search
USPC ............... 455/127.1, 39, 574; 307/66, 43, 307/45; 340/870.01, 870.02; 375/295
See application file for complete search history.

(56) References Cited

U.S. PATENT DOCUMENTS

| | | | | |
|---|---|---|---|---|
| 5,631,503 | A * | 5/1997 | Cioffi | 307/66 |
| 6,856,654 | B1 * | 2/2005 | Carkner et al. | 375/295 |
| 8,269,651 | B2 * | 9/2012 | Zigdon et al. | 340/870.11 |
| 2006/0264188 | A1 * | 11/2006 | Mars et al. | 455/127.1 |

FOREIGN PATENT DOCUMENTS

| | | |
|---|---|---|
| EP | 1445780 | 8/2004 |
| JP | 9-130846 | 5/1997 |
| JP | 2004-297753 | 10/2004 |
| JP | 2005-537776 | 12/2005 |
| JP | 2006-157865 | 6/2006 |
| JP | 2007-148937 | 6/2007 |
| JP | 2008-148124 | 6/2008 |
| JP | 2009-253826 | 10/2009 |
| KR | 1020010091481 | 10/2001 |
| KR | 20060127089 | 12/2006 |
| KR | 20090097805 | 9/2009 |

\* cited by examiner

*Primary Examiner* — April G Gonzales
(74) *Attorney, Agent, or Firm* — Lee, Hong, Degerman, Kang & Waimey

(57) ABSTRACT

A method and apparatus for transmitting data in a wireless communication system are disclosed, which transmit uplink data in consideration of mobile station (MS) consumption power such that a UE can be stably operated at a cell edge. A method for transmitting data by a mobile station (MS) of a wireless communication system includes transmitting, if MS power consumption is higher than limitation of power consumption, data to a base station (BS) with power higher than the limitation of power consumption using power supplied from a primary power-supply unit and a storage unit during a first time, and charging the storage unit using the primary power-supply unit during a second time, wherein the limitation of power consumption indicates maximum power amount capable of being normally supplied from the primary power-supply unit.

9 Claims, 14 Drawing Sheets

METHOD AND APPARATUS FOR TRANSMITTING DATA IN WIRELESS COMMUNICATION SYSTEM

CROSS-REFERENCE TO RELATED APPLICATIONS

Pursuant to 35 U.S.C. 119, this application claims the benefit of earlier filing date and right of priority to Korean Patent Application Nos. 10-2010-0106970, filed on Oct. 29, 2010, and 10-2009-0132285, filed on Dec. 29, 2009, and also claims the benefit of U.S. Provisional Patent Application Ser. No. 61/285,521, filed on Dec. 10, 2009, the contents of which are all incorporated by reference herein in their entirety.

BACKGROUND OF THE INVENTION

1. Field of the Invention

The present invention relates to a method and apparatus for transmitting data in a wireless communication system, and more particularly to a method and apparatus for transmitting uplink data in consideration of Mobile Station (MS) consumption power for enabling a UE to be stably operated at a cell edge.

2. Discussion of the Related Art

A wireless communication system has been widely used to provide various kinds of communication services such as voice or data services. Generally, a wireless communication system is a multiple access system that can communicate with multiple users by sharing available system resources (bandwidth, transmission (Tx) power, and the like).

A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

It is necessary for the wireless communication system to control uplink transmission power, so that the magnitude of a reception (Rx) signal can be properly adjusted by a base station (BS). If transmission (Tx) power is two small in uplink (UL) transmission, the BS is unable to receive a transmission (Tx) signal from the UE. In contrast, if Tx power is too strong in UL transmission, a Tx signal of the UE may interfere with a Tx signal of another UE, resulting in an increase in battery power consumption. The magnitude of the Rx signal is kept in a proper level by controlling uplink transmission (UL TX) power, unnecessary power consumption is prevented from being generated in a UE, and a data transfer rate and the like are adaptively decided, resulting in an increase in transmission efficiency.

Therefore, it is necessary for various technologies for effectively controlling UL transmission power in a wireless communication system to be developed.

FIG. 1 is a graph illustrating a variation of power consumed by a Long Term Evolution (LTE) User Equipment (UE) which transmits data and/or control information via uplink. The UE transmits data and/or control information to a base station (BS) using transmission (Tx) power received from the BS according to an agreement between the UE and the BS. However, the BS may command the UE to transmit data and/or control information with a greater transmission (Tx) power in proportion to the increasing distance from the BS to the UE, so that total power consumption of the UE is increased in proportion to the increasing distance between the UE and the BS. However, the BS commands the UE to transmit data and/or control information with higher Tx power in proportion to a distance from the BS to the UE, so that total power consumption of the UE is increased in proportion to the distance from the UE to the BS.

FIG. 2 shows that UL data is transmitted with time in a cell edge region. Referring to FIG. 2, the UE is characterized in that it transmits data at all times so as to acquire a desired data throughput from a cell edge region having a poor environment.

The 'Limitation of Power Consumption' line shown in FIG. 1 indicates maximum power amount capable of being normally supplied from a primary power-supply unit, and represents a reference line at which the UE is turned off or does not perform the corresponding faulty operation. For example, assuming that the primary power-supply unit provides power higher than the 'limitation of power consumption' line to the UE, the UE may be excessively heated or the power of the primary power-supply unit is consumed in a short period of time.

In accordance with the related art, if total power consumption of the UE is higher than the 'limitation of power consumption' line, it is impossible to guarantee a service of a predetermined level. In particular, power consumption of the UE is higher than the 'limitation of power consumption' line in a cell edge region distant from the BS, and the UE transmits UL data at almost all times, so that a faulty operation occurs due to a shortage of UE power and it may be impossible to provide a service to the UE or a user.

As described above, according to the related art, if total power consumption of the UE is higher than the 'limitation of power consumption' line, a faulty operation occurs in the UE.

SUMMARY OF THE INVENTION

Accordingly, the present invention is directed to a method and apparatus for transmitting data in a wireless communication system that substantially obviate one or more problems due to limitations and disadvantages of the related art.

An object of the present invention is to provide a data transmission method for allowing a user equipment (UE) to be stably operated although total power consumption of the UE is higher than a 'limitation of power consumption' line.

Another object of the present invention is to provide a UE for effectively controlling UL transmission power using a plurality of power-supply units and a method for controlling UL transmission power using the UE.

It will be appreciated by persons skilled in the art that the objects that can be achieved by the present invention are not limited to what have been particularly described hereinabove and the above and other objects that the present invention can achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data by a mobile station (MS) of a wireless communication system includes transmitting, if power consumption of the mobile station (MS) is higher than limitation of power consumption, first data to a base station (BS) with power higher than the limitation of power consumption using power supplied from a primary power-supply unit and a storage unit during a first time, and charging the storage unit using the primary power-supply unit during a second time, wherein the limitation of power consumption indicates maximum power amount capable of being normally supplied from the primary power-supply unit.

The method may further include monitoring power consumption of the mobile station (MS).

The method may further include, if power consumption of the mobile station is higher than the limitation of power consumption, informing the base station (BS) of specific information that indicates that power consumption of the mobile station is higher than the limitation of power consumption, and receiving uplink data transmission scheduling generated using the specific information, from the base station (BS), wherein the step of transmitting comprises transmitting the first data to the base station (BS) according to the uplink data transmission scheduling.

The method may further include receiving uplink data transmission scheduling from the base station (BS), wherein the base station (BS) monitors transmission power of the mobile station (MS) and determines that the power consumption of the mobile station (MS) is higher than the limitation of power consumption when the monitored transmission power is higher than a predetermined reference value, and thus generates the uplink data transmission scheduling in consideration of a charging time of the storage unit.

The second time may be decided in consideration of a transmission time of uplink control information.

The method may further include transmitting second data to the base station (BS) with power higher than the limitation of power consumption using power supplied from the primary power-supply unit and the storage unit during a third time, and charging the storage unit during a fourth time, wherein the fourth time is different from the second time.

In another aspect of the present invention, a method for receiving data by a base station (BS) of a wireless communication system include transmitting uplink data transmission scheduling to a mobile station (MS), and receiving no data during a first time, and receiving data transmitted with power higher than the limitation of power consumption of the mobile station (MS) using power supplied from a primary power-supply unit of the mobile station (MS) and a storage unit of the mobile station (MS) during a second time according to the uplink data transmission scheduling, wherein the limitation of power consumption indicates maximum power amount capable of being normally supplied from the primary power-supply unit of the mobile station (MS), and the first time indicates a charging time of the storage unit.

The method may further include receiving specific information from the mobile station (MS), the specific information indicating that power consumption of the mobile station (MS) is higher than the limitation of power consumption, and generating the uplink data transmission scheduling using the specific information.

In another aspect of the present invention, a mobile station (MS) for use in a wireless communication system includes a primary power-supply unit for providing a power-supply signal required for operating of the mobile station (MS), a storage unit that is charged using power of the primary power-supply unit when power consumption of the mobile station (MS) is equal to or less than limitation of power consumption, and a transmission module, if the power consumption of the mobile station (MS) is higher than the limitation of power consumption, for transmitting no data during a first time, and transmitting data to a base station (BS) with power higher than the limitation of power consumption using power supplied from the primary power-supply unit and the storage unit during a second time, wherein the limitation of power consumption indicates maximum power amount capable of being normally supplied from the primary power-supply unit.

In another aspect of the present invention, a base station (BS) for use in a wireless communication system includes a transmission module for transmitting uplink data transmission scheduling to a mobile station (MS), and a reception module for receiving no data during a first time, and receiving data transmitted with power higher than the limitation of power consumption of the mobile station (MS) using power supplied from a primary power-supply unit of the mobile station (MS) and a storage unit of the mobile station (MS) during a second time according to the uplink data transmission scheduling, wherein the limitation of power consumption indicates maximum power amount capable of being normally supplied from the primary power-supply unit of the mobile station (MS), and the first time indicates a charging time of the storage unit.

In another aspect of the present invention, a method for controlling uplink transmission power includes acquiring a power consumption level, if the power consumption level is not higher than a reference value, storing surplus power other than power consumption from among a first supply power supplied from a first power-supply unit in a second power-supply unit, and if the power consumption level is higher than the reference value, controlling transmission power of an uplink channel using the first supply power and a second supply power supplied from the second power-supply unit.

In another aspect of the present invention, a method for controlling uplink transmission power includes acquiring uplink transmission power consumed for transmitting an uplink channel other than reference power decided by a certain reference, if the uplink transmission power is not higher than a reference value, storing surplus power other than power consumption from among a first supply power supplied from a first power-supply unit in a second power-supply unit, and if the uplink transmission power is higher than the reference value, controlling transmission power of an uplink channel using the first supply power and a second supply power supplied from the second power-supply unit.

In another aspect of the present invention, a mobile station (MS) includes a wireless communication unit, first and second power-supply units, and a controller that acquires a power consumption level, if the power consumption level is not higher than a reference value, stores surplus power other than power consumption from among a first supply power supplied from the first power-supply unit in the second power-supply unit, and controls transmission power of an uplink channel using the first supply power. If the power consumption level is higher than the reference value, the controller controls the uplink channel transmission power through a wireless communication unit using the first supply power and a second supply power supplied from the second power-supply unit.

In another aspect of the present invention, a mobile station (MS) includes a wireless communication unit, first and second power-supply units, and a controller. The controller acquires uplink transmission power consumed for transmitting an uplink channel other than reference power decided by a certain reference. If the uplink transmission power is not higher than a reference value, the controller stores surplus power other than power consumption from among a first supply power supplied from a first power-supply unit in a second power-supply unit, controls the uplink channel transmission power using the first supply power. If the uplink channel transmission power is higher than the reference value, the controller controls transmission power of an uplink channel through the wireless communication unit using the first supply power and a second supply power supplied from the second power-supply unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. In the following description, known functions or structures, which may confuse the substance of the present invention, are not explained. Additionally, procedures or steps, which can be understood by those skilled in the art, are not explained as well.

The following embodiments can be applied to a variety of wireless access systems, such as a Code Division Multiple Access (CDMA) system, a Frequency Division Multiple Access (FDMA) system, a Time Division Multiple Access (TDMA) system, an Orthogonal Division Multiple Access (OFDMA) system, a Single Carrier Frequency Division Multiple Access (SC-FDMA) system, etc. The CDMA system can be implemented with a radio technology such as Universal Terrestrial Radio Access (UTRA) or CDMA2000. The TDMA system can be implemented with a radio technology such as Global System for Mobile communications (GSM)/General Packet Radio Service (GPRS)/Enhanced Data Rates for GSM Evolution (EDGE). The OFDMA system may be implemented with a radio technology, such as IEEE 802.11 (Wi-Fi), IEEE 806.11 (WiMAX), IEEE 802.20, E-UTRA (Evolved UTRA), etc. The UTRAN system is a part of a Universal Mobile Telecommunications System (UMTS). The $3^{rd}$ Generation Partnership Project (3GPP) Long Term Evolution (LTE) is a part of Evolved UMTS (E-UMTS) based on E-UTRA. The 3GPP LTE system uses the OFDMA on a downlink, and uses the SC-FDMA on an uplink. The LTE-Advanced (LTE-A) is the evolution of the 3GPP LTE. For convenience of description and better understanding of the present invention, although the following embodiment will be described on the basis of the 3GPP LTE and LTE-A systems, the technical idea of the present invention is not limited thereto.

Figure 3:
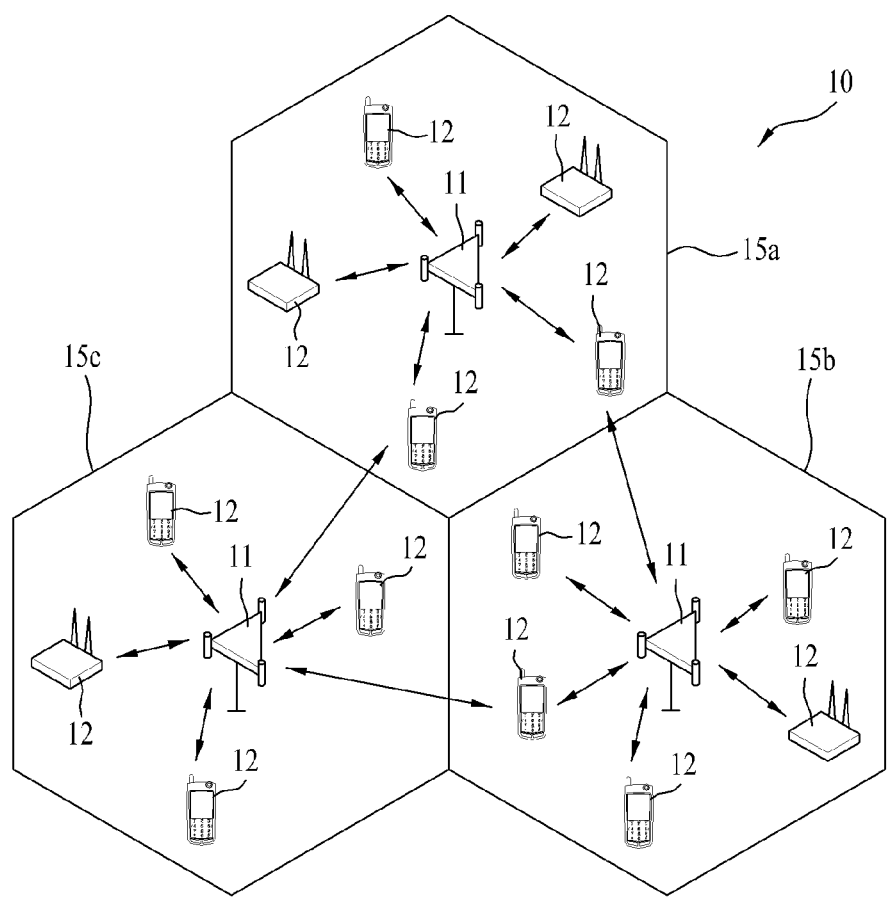
FIG. 3 shows a wireless communication system.

FIG. 3 shows a wireless communication system.

Figure 10:
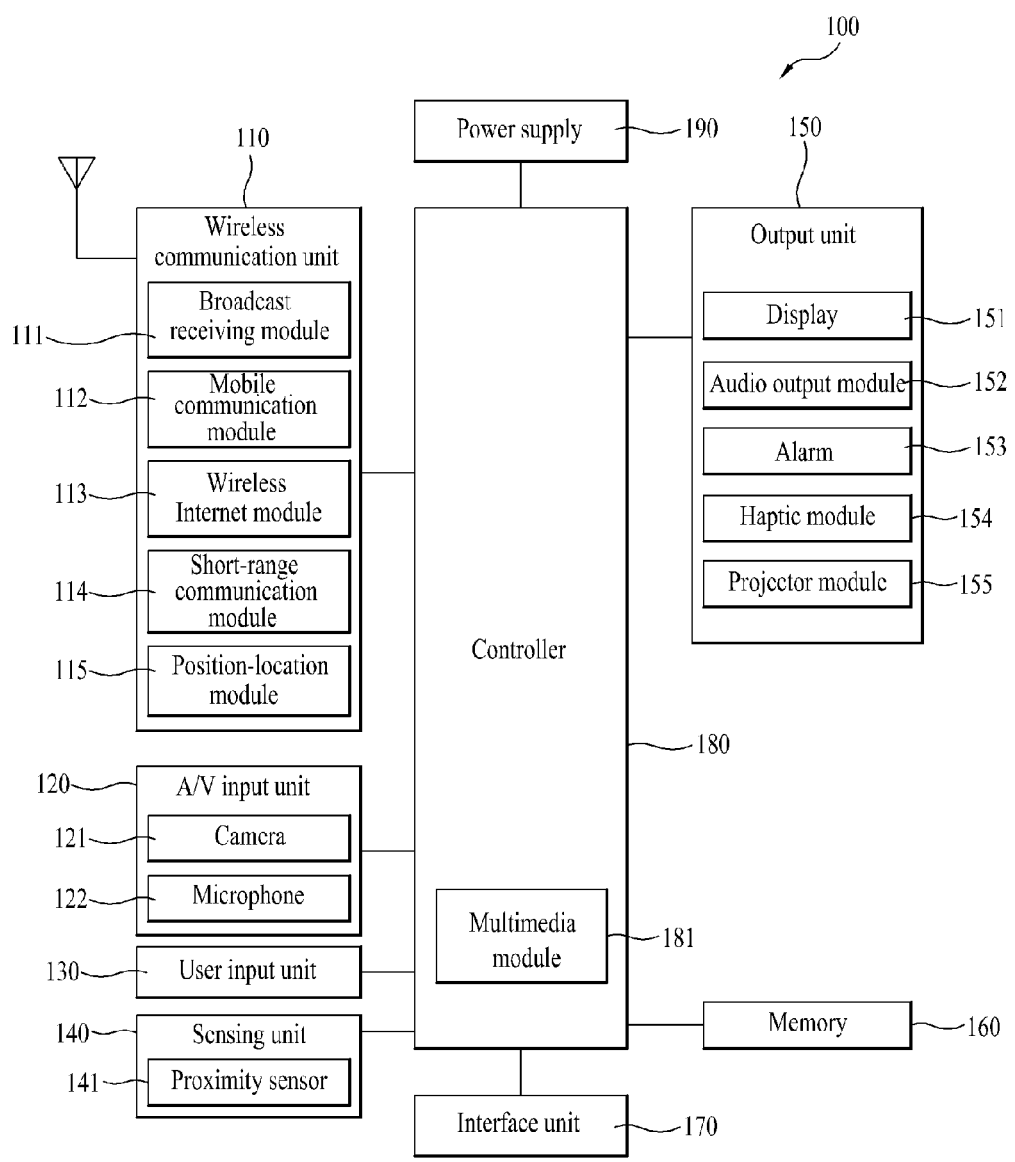
FIG. 10 is a block diagram illustrating a mobile station (MS) according to an embodiment of the present invention.

Referring to FIG. 10, a wireless communication system includes at least one base station (BS). Each BS 11 provides a communication service to a specific geographical region (generally called a cell) 15a, 15b or 15c. Each cell may be divided into a plurality of regions, each of which is called a sector. One BS includes one or more cells.

A mobile station (MS) 100 may be fixed or have mobility, and may also be referred to as any of a User Equipment (UE), a User Terminal (UT), a Subscriber Station (SS), a Wireless Device, a Personal Digital Assistant (PDA), a Wireless Modem, a Handheld Device, an Access Terminal (AT), etc.

The BS 11 may be a fixed station communicating with the MS 100, and may be referred to as any of an evolved-NodeB (eNB), a Base Transceiver System (BTS), an Access Point (AP), an Access Network (AN), etc.

In the following description, a downlink (DL) may indicate communication from the BS 11 to the MS 100, and an uplink (UL) may indicate communication from the MS 100 to the BS 11.

In downlink (DL), a transmitter may be a part of the BS, and a receiver may be a part of the MS. In uplink (UL), a transmitter may be a part of the MS, and a receiver may be a part of the BS.

Figure 4:
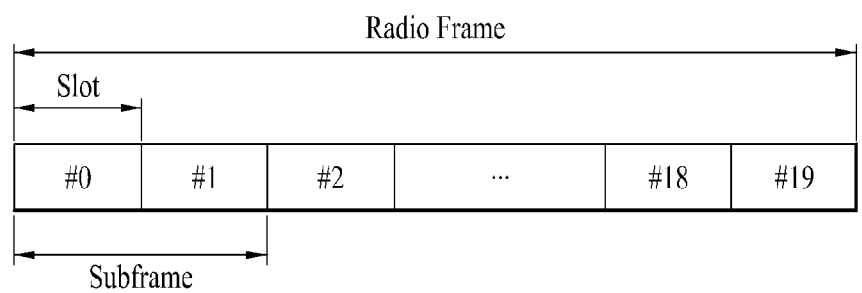
FIG. 4 shows a radio frame structure for use in the 3GPP LTE.

FIG. 4 shows a radio frame structure for use in the 3GPP LTE.

Referring to FIG. 4, a radio frame includes 10 subframes, one subframe includes two slots. A time required for transmitting one subframe is called a Transmission Time Interval (TTI). For example, the length of one subframe may be set to 1 ms, and the length of one slot may be set to 0.5 ms.

One slot includes a plurality of Orthogonal Frequency Division Multiplexing (OFDM) symbols in a time domain, and includes a plurality of Resource Blocks (RBs) in a frequency domain. The OFDM symbol may be adapted to represent one symbol period because the 3GPP LTE uses the OFDMA technology on a downlink, and may be referred to as an SC-FDMA symbol or a symbol period according to a multiple access scheme. One RB includes a plurality of successive subcarriers in one slot on a RB basis.

The radio frame structure shown in FIG. 4 is disclosed for illustrative purposes only, and the number of subframe contained in a radio frame, the number of slots contained in a subframe, and the number of FDM symbols contained in the slot may be changed in various ways.

Figure 5:
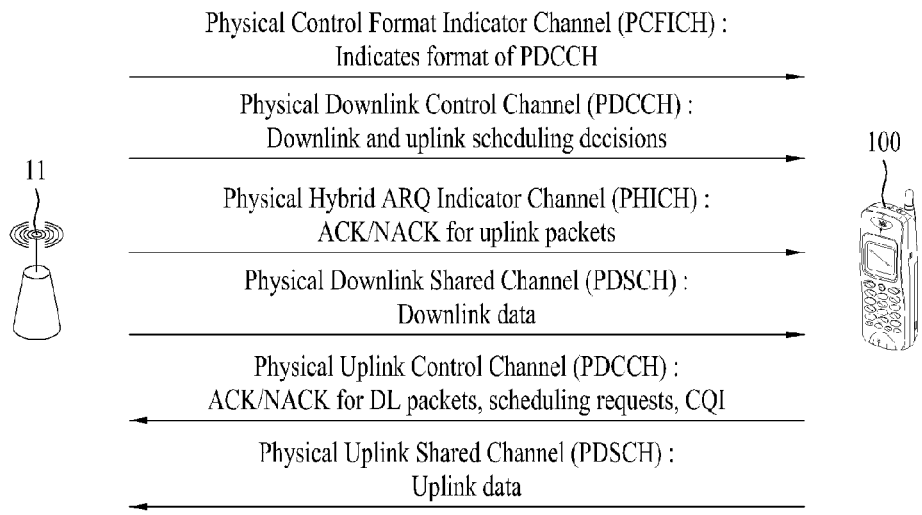
FIG. 5 shows exemplary communication channels corresponding to physical layers of the 3GPP LTE.

FIG. 5 shows exemplary communication channels corresponding to physical layers of the 3GPP LTE.

Referring to FIG. 5, a UL channel for use in the 3GPP LTE may include a Physical Random Access Channel (PRACH), a Physical Uplink Control Channel (PUCCH) for transmitting control information, a Physical Uplink Shared Channel (PUSCH) for transmitting data, etc.

According to a data transmission method and a method for transmitting and constructing a PUSCH defined in the LTE standard, the PUSCH may transmit either information in which control information and data are multiplexed or other information composed of only control information.

Random access information is used as information for random access between the BS 11 and the MS 100, and is of importance. The control information is considered to be important in a UL or DL coverage balance, a DL feedback, etc.

Details information of each UL channel is well known to those skilled in the art, and as such a detailed description thereof will herein be omitted for convenience of description.

The MS 100 according to the embodiments of the present invention will hereinafter be described with reference to the accompanying drawings. In the following description, a suffix "module" or "unit" contained in terms of constituent elements to be described will be selected or used together in consideration only of the convenience of writing the following specification, and the suffixes "module" and "unit" do not necessarily have different meanings or roles.

Figure 6:
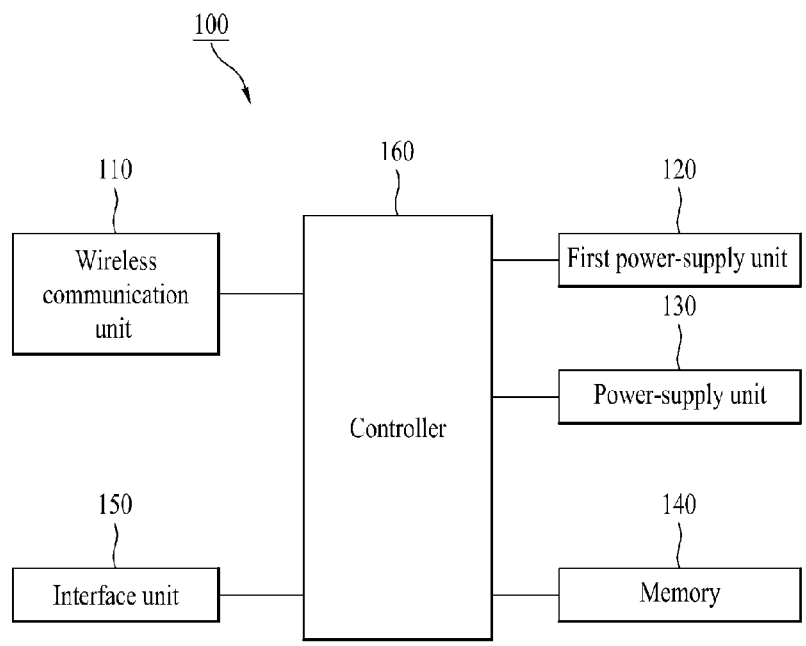
FIG. 6 is a block diagram illustrating a mobile station (MS) according to an embodiment of the present invention.

FIG. 6 is a block diagram illustrating a mobile station (MS) according to an embodiment of the present invention.

Referring to FIG. 6, the MS 100 may include a wireless communication unit 110, a first power-supply unit 120, a second power-supply unit 130, a memory 140, an interface unit 150, and a controller 160.

The wireless communication unit 110 may include at least one module, that is located between the MS 100 and a wireless communication system or implements wireless communication between the MS 100 and a network including the MS 100.

The wireless communication unit 110 may support wireless communication based on at least one wireless communication standard. For example, the wireless communication unit 110 may provide wireless communication based on at least one of CDMA, WCDMA, and LTE communication schemes.

If the wireless communication unit 110 provides wireless communication based on different wireless communication standards, individual wireless communication functions based on individual wireless communication standards may be implemented in one chip, or may also be implemented in different chips.

The first power-supply unit 120 and the second power-supply unit 130 receive an external power-supply signal and an internal power-supply signal under the control of the controller 160, and provide a power-supply signal requisite for operations of the individual constituent elements.

The first power-supply unit 120 may operate as a primary power-supply unit, and the second power-supply unit 130 may operate as a sub power-supply unit.

For example, the first power-supply unit 120 may receive a power-supply signal to be provided to the MS 100 from one or more sources. For example, the power supplied from the first power-supply unit 120 may be received from an external part through a Universal Serial Bus (USB), a DC-JACK, etc.

For example, the second power-supply unit 130 may temporarily increase the limitation of power consumption decided by the power supplied from the first power-supply unit 120. The second power-supply unit 130 may be implemented as a bulk capacitor, a super capacitor, a battery, or the like.

The memory 140 may store a program for operating the controller 160, and may temporarily store I/O data (for example, a phonebook, a message, a still image, a moving image, etc.).

The memory 140 may include a storage medium of at least one type of a flash memory, a hard disk, a multimedia card micro type, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

The interface unit 150 may be used as a path via which the MS 100 is connected to all external devices. The interface unit 150 receives data from the external devices, or receives a power-supply signal from the external devices, such that it transmits the received data and the power-supply signal to each constituent element contained in the MS 100, or transmits data stored in the MS 100 to the external devices. For example, the interface unit 150 may include a wired/wireless headset port, an external charger port, a wired/wireless data port, a memory card port, a port connected to a device including an identification module, an audio I/O port, a video I/O port, an earphone port, and the like.

The controller 160 generally controls overall operations of the MS 100. For example, the controller 160 may perform data communication through the wireless communication unit 110, and also perform control and processing for transmission (Tx) power control of a UL channel.

A variety of embodiments to be disclosed in the following description may be implemented in a computer or a computer-readable recording medium by means of software, hardware, or a combination thereof.

In the case of implementing the present invention by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for implementing other functions, etc. In some cases, embodiments of the present invention may also be implemented as the controller 160.

In the case of implementing the present invention by software, embodiments having the same procedures and functions may be implemented with additional software modules. Each of the software modules may perform one or more functions and operations of the present invention. A software code may be implemented as a software application written in suitable programming languages. The software code may be stored in the memory 140, and may be carried out by the controller 160.

Figure 7:
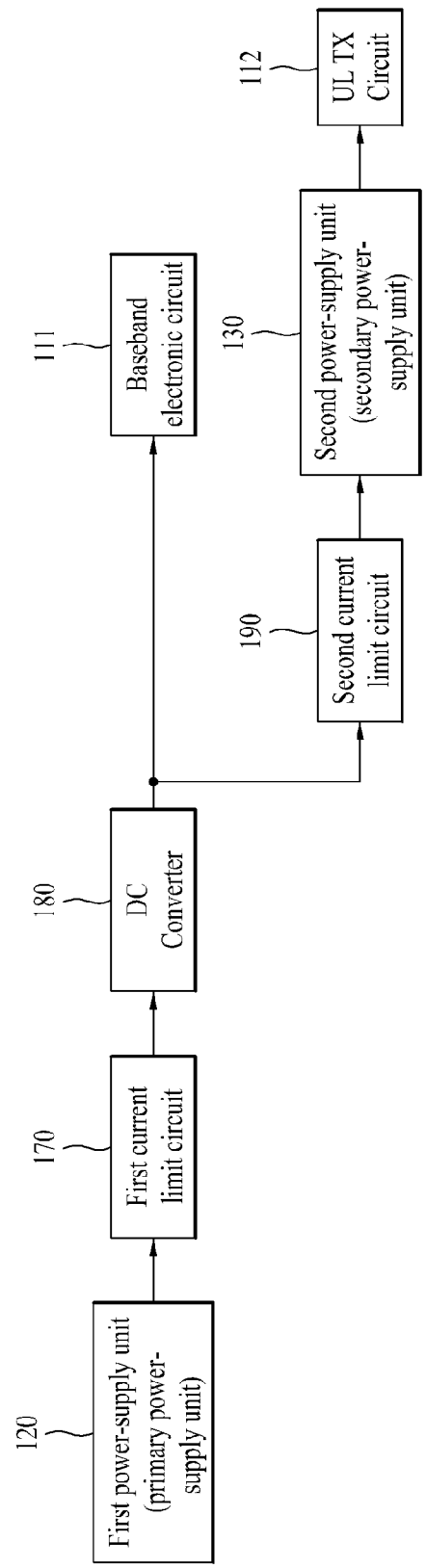
FIG. 7 is a block diagram illustrating the flow of current flowing in a mobile station (MS) according to an embodiment of the present invention.

FIG. 7 is a block diagram illustrating the flow of current flowing in a mobile station (MS) 100 according to an embodiment of the present invention. In one embodiment of the present invention, the MS 100 shown in FIG. 6 may include new constituent elements shown in FIG. 7.

Besides the constituent elements shown in FIG. 6, the MS 100 may further include a first current limit circuit 170, a DC converter 180, a baseband electronic circuit 111, a second current limit circuit 190, and an uplink Tx circuit 112.

The first current limit circuit 170 limits the maximum power amount of the MS 100 so that it protects the first power-supply unit 120.

The DC converter 180 receives an input voltage from the first power-supply unit 120, and converts the received voltage into a basic voltage used for an electronic circuit of the MS 100.

Meanwhile, the first current limit circuit 170 may be contained in the DC converter 180.

The baseband electronic circuit 111 may include a main chip for controlling the overall function of the MS 100 and an additional circuit. The baseband electronic circuit 111 may be mutually correspondent to the controller 180.

The second current limit circuit 190 adjusts a charging current toward the second power-supply unit 130, so that the MS 100 may be turned off due to the charging or the corresponding faulty operation may be restricted.

The UL transmission circuit 112 can monitor necessary amount of energy of the second power-supply unit 130 in relation to the baseband electronic circuit 111, and can effectively control the use of the second power-supply unit 130 according to the monitored result. The UL transmission unit 112 may be contained in the wireless communication unit 110.

Figure 8:
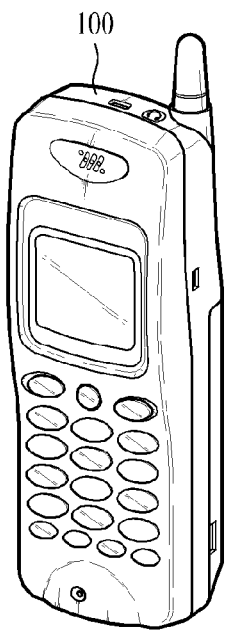
FIGS. 8 and 9 show implementation examples of a mobile station (MS) according to an embodiment of the present invention.
Figure 9:
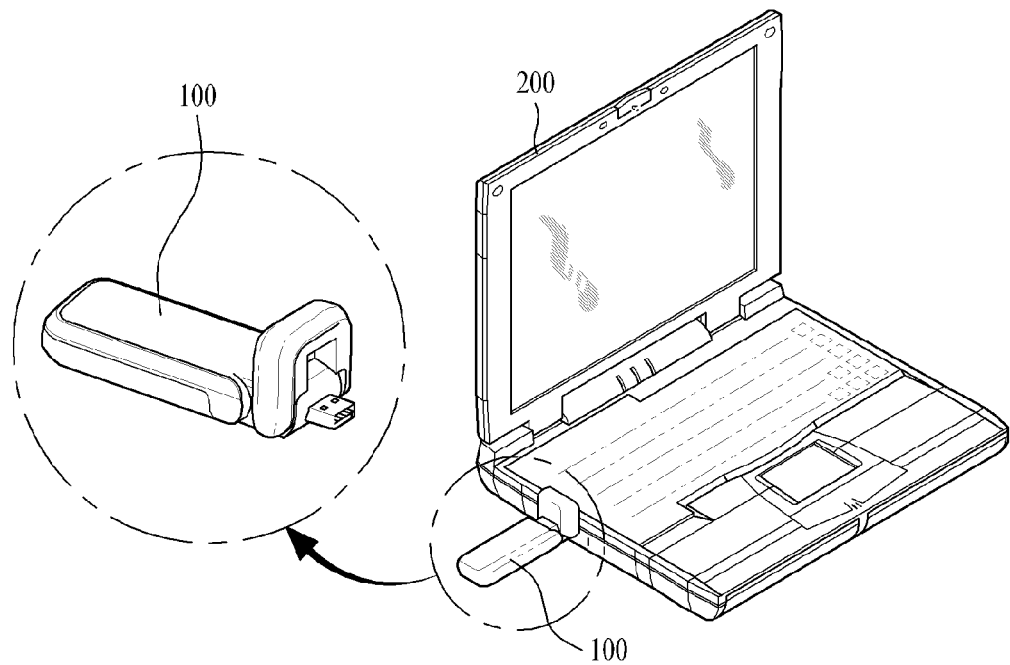

FIGS. 8 and 9 show implementation examples of a mobile station (MS) according to an embodiment of the present invention. Referring to FIG. 8, the MS 100 may be implemented to self-communicate with the BS 11. Referring to FIG. 9, the MS 100 may be mounted as a data card to another MS 200, so that it can communicate with the BS 11.

If the MS 100 is implemented as shown in FIG. 9, the MS may receive a power-supply signal from another MS 200 through the interface unit 150. In this case, the power-supply signal may be applied to the inside of the MS 100 through the first power-supply unit 120.

For example, the MS 100 may be mounted to a USB port of another MS 200, so that it can receive a power-supply signal through the USB port. In this case, according to the USB 2.0 standard, the use of a power-supply signal up to 500 mA may be restricted.

The present invention relates to a method and apparatus for transmitting uplink (UL) data in consideration of MS power that enables the MS to be stably operated in a cell edge region. The MS power consumption may be largely classified into power consumption of an electronic circuit capable of enabling the MS to maintain a stable state, power consumption requisite for the decoding of a signal received via downlink, and power consumption used for amplifying a transmission (Tx) signal so as to transmit a signal via uplink. In this case, the power consumption requisite for amplifying the Tx signal is greatly changed according to UL transmission power prescribed in the LTE standard, whereas the power consumption of the electronic circuit and the power consumption requisite for the decoding of a reception (Rx) signal are not greatly changed in all operations satisfying the LTE system standard. In the LTE system, UL transmission power is defined as a maximum of 23 dBm.

The present invention relates to a method and apparatus for transmitting UL data in consideration of MS power consumption, and the method and apparatus of the present invention can be applied to the MS.

The MS according to the present invention will hereinafter be described with reference to the accompanying drawings. In the following description, a suffix "module" or "unit" contained in terms of constituent elements to be described will be selected or used together in consideration only of the convenience of writing the following specification, and the suffixes "module" and "unit" do not necessarily have different meanings or roles.

The MS according to the present invention may include a mobile phone, a smart phone, a laptop computer, a terminal for digital broadcasting, a Personal Digital Assistants (PDA), a Portable Multimedia Player (PMP), a navigation, etc.

FIG. 10 is a block diagram illustrating the mobile station (MS) 100 according to an embodiment of the present invention.

Referring to FIG. 10, the MS 100 may include a radio frequency (RF) communication unit 110, an Audio/Video (A/V) input unit 120, a user input unit 130, a sensing unit 140, an output unit 150, a memory 160, an interface unit 170, a controller 180, a power-supply unit 190, etc. Since constituent elements shown in FIG. 10 are not essential, another MS having many more or less constituent elements than those of FIG. 10 may be implemented.

The above-mentioned constituent elements will hereinafter be described with reference to the accompanying drawings.

The wireless communication unit 110 may include at least one module, that is located between the MS 100 and a wireless communication system or implements wireless communication between the MS 100 and a network including the MS 100. For example, the wireless communication unit may include a broadcast reception module 111, a mobile communication module 112, a wireless Internet module 113, a short range communication module 114, a position information module 115 (e.g., a GPS module), etc.

The broadcast reception module 111 receives a broadcast signal and/or broadcast-related information from an external broadcast management server over a broadcast channel (BCH).

The broadcast channel may include a satellite channel and a terrestrial channel. The broadcast management server may be a server that generates and transmits a broadcast signal and/or broadcast-related information or a server that receives and transmits a previously generated broadcast signal and/or broadcast-related information to a terminal. The broadcast signal may not only include a TV broadcast signal, a radio broadcast signal, and a data broadcast signal but may also include a broadcast signal that is a combination of a TV or radio broadcast signal with a data broadcast signal.

The broadcast-related information may be information associated with a broadcast channel, a broadcast program, or a broadcast service provider. The broadcast-related information may also be provided through a mobile communication network. In this case, the broadcast-related information may be received through the mobile communication module 112.

The broadcast-related information may be provided in a variety of forms. For example, the broadcast-related information may be provided in the form of a Digital Multimedia Broadcasting (DMB) Electronic Program Guide (EPG) or a Digital Video Broadcasting-Handheld (DVB-H) Electronic Service Guide (ESG).

The broadcast reception module 111 can receive digital broadcast signals using a digital broadcast system such as Digital Multimedia Broadcasting-Terrestrial (DMB-T), Digital Multimedia Broadcasting-Satellite (DMB-S), Media Forward Link Only (MediaFLO), Digital Video Broadcasting-Handheld (DVB-H), or Integrated Services Digital Broadcasting-Terrestrial (ISDB-T). Of course, the broadcast reception module 111 may be constructed so as to be suitable not only for the digital broadcast system but also for any other type of broadcast system that provides broadcast signals.

A broadcast signal and/or broadcast-related information received through the broadcast reception module 111 may be stored in the memory 160.

The mobile communication module 112 transmits and receives a radio frequency (RF) signal to and from at least one of a base station (BS), an external MS, and a server over a mobile communication network. Here, the RF signal may include a voice call signal, a video communication call signal, or data in a variety of formats associated with transmission and reception of text/multimedia messages.

The mobile communication module 112 may include a transmission (Tx) module for transmitting an RF signal and a reception (Rx) module for receiving an RF signal. The wireless Internet module 113, which is a module for wireless Internet connection, may be installed inside or outside of the MS 100. A variety of wireless Internet technologies can be used, for example, Wireless LAN (WNAN) (Wi-Fi), Wireless broadband (WiBro), World Interoperability for Microwave Access (WiMax), High Speed Downlink Packet Access (HSDPA), and the like. In this case, the Internet module 112 may be installed inside or outside of the mobile terminal 100. A variety of wireless Internet technologies can be used, for example, Wireless LAN (WNAN) (Wi-Fi), Wireless broadband (WiBro), World Interoperability for Microwave Access (WiMax), High Speed Downlink Packet Access (HSDPA), and the like.

The short range communication module 114 is a module for implementing short range communication. In this case, a variety of short range communication technologies can be used, for example, Bluetooth, Radio Frequency Identification (RFID), Infrared Data Association (IrDA), Ultra Wideband (UWB), ZigBee, and the like.

The position recognition unit 115 serves as a Global Positioning System (GPS), such that it can recognize a current position of the MS 100.

Referring to FIG. 10, the A/V input unit 120 is used to input an audio signal or a video signal and may include a camera module 121, a microphone module 122, and the like. The camera module 121 processes an image frame of a still image or a moving image acquired through an image sensor in a video communication mode or an image capture mode. The processed image frame may be displayed on a display unit 151.

The image frame processed by the camera module 121 may also be stored in the memory 160 or may be transmitted to the outside through the wireless communication unit 110. The A/V input part 120 may include two or more camera modules 121 depending on use environments.

The microphone module 122 receives an external sound signal through a microphone and processes it into electrical audio data in a phone call mode or an audio recording mode, or a voice recognition mode. In the phone call mode, the processed audio data may be converted into a format transmittable to a base station (BS) through the mobile communication module 112. The microphone module 122 may implement a variety of noise removal algorithms for removing noise occurring when receiving external sound signals.

The user input unit 130 generates key input data corresponding to key strokes that the user has entered for controlling the operation of the MS. The user input unit 130 may include a key pad, a dome switch, a touchpad (including a static-pressure type and an electrostatic type), a jog wheel, a jog switch, and the like.

The sensing unit 140 detects the current state of the MS 100 such as an open/closed state of the MS 100, location of the MS 100, acceleration or deceleration of the MS 100, and generates a sensing signal for controlling the operation of the MS 100. For example, when the MS 100 is a slide mobile phone, the sensing unit 140 may detect whether the slide phone has been opened or closed. The sensing unit 140 also provides sensing functions associated with detection of whether or not the power-supply unit 190 supplies power or whether or not the interface unit 170 has been coupled with an external device. Meanwhile, the sensing unit 140 may include a proximity sensor 141.

The output unit 150 is provided to output an audio signal, a video signal, or a tactile signal and may include the display unit 151, a sound output module 152, an alarm unit 153, a haptic module 154, a projector module 155, and the like.

The projector module 155 is a constituent element that performs an image project function using the MS 100. The projector module 155 may enlarge all or some of the image displayed on the display unit 151 upon receiving a control signal from the controller 180.

The projector module 155 may include a light source (not shown) that generates a light beam for outputting an image to an external part, a display part (not shown) that displays an image upon receiving the light beam from the light source, and/or a lens (not shown) that enlarges an image displayed on the display part at a predetermined focal length. The light source may generate a laser beam. The image being output through the lens may be zoomed in on and enlarged on an external screen.

The projector module 155 may be classified into a Cathode Ray Tube (CRT) module, a Liquid Crystal Display (LCD) module, and/or a Digital Light Processing (DLP) module according to categories of the display part. Specifically, the DLP module allows a light beam generated from the light source to pass through a wheel, reflect a displayed image in a Digital Micromirror Device (DMD) chip, enlarge and project the reflected image, and is beneficial to miniaturization of the projector module 155.

The projector module 155 may be located at the lateral part, the front part, or the rear part of the MS 100 in a longitudinal direction. Needless to say, the projector module 155 may be located anywhere within the MS 100 as necessary.

The display unit 151 displays (outputs) information processed in the MS 100. For example, in a case in which the MS 100 is in a communication mode, the display unit 151 displays a communication-related user interface (UI) or graphical user interface (GUI). In a case in which the MS 100 is in a video communication mode or an image capture mode, the display unit 151 may individually or simultaneously display captured or received images. Also, the display unit 151 may display a corresponding UI or GUI.

The display 151 may include at least one of a liquid crystal display (LCD), a thin film transistor-liquid crystal display (TFT LCD), an organic light-emitting diode (OLED), a flexible display, and a three-dimensional (3D) display.

Some of the above-specified displays may be configured in a transparent structure or in an optically transmissive structure such that one can see through the screen and out the back of the display. Such displays may be referred to as transparent displays. A representative example of the transparent displays may be transparent OLED (TOLED). The rear of the display unit 151 may be configured in an optically transmissive structure. In this structure, it is possible for a user to see things behind the MS body through a region, occupied by the display unit 151, of the MS body.

Two or more display units 151 may be provided depending on how the MS 100 is constructed. For example, the MS 100 may include both an external display unit (not shown) and an internal display unit (not shown). For example, a plurality of display units may be spaced apart from one surface of the MS 100 or be integrated in one. In addition, the display units may be arranged at different surfaces, respectively.

If the display unit 151 and a sensor for sensing a touching action (hereinafter referred to as a touch sensor) are configured in the form of a layer, namely, if the display unit 151 and the touch sensor are configured in the form of a touch screen, the display unit 151 may also be used as an input unit in addition to being used as the output unit. The touch sensor may be configured in the form of a touch film, a touch sheet, a touch pad, and the like.

The touch sensor detects the pressure applied to a specific part of the display unit 151 or a variation of electrostatic capacity generated from such a specific part of the display unit 151, and converts the detected pressure and the variation of electrostatic capacity into an electric input signal. The touch sensor may be configured to detect not only information about the position and region where the user touches, but also information about the pressure generated by the user's touching action.

If the user touches the touch sensor, signal(s) corresponding to the user's touching action are transferred to the touch controller. The touch controller processes the received signal (s), and transmits data corresponding to the received signal(s) to the controller 180. Therefore, the controller 180 can determine which region of the display unit 151 has been touched on the basis of the received data.

The sound output module 152 may output audio data which has been received from the wireless communication unit 110 or has been stored in the memory 160 during a call signal reception mode, a call connection mode, a recording mode, a voice recognition mode, a broadcast reception mode, and the like. The sound output module 152 may output sound signals related to functions (e.g., call signal reception sound, message reception sound, etc.) carried out in the MS 100. The sound output module 152 may include a receiver, a speaker, a buzzer, and the like.

The alarm unit 153 outputs a signal notifying the user that an event has occurred in the MS 100. Examples of the event occurring in the MS 100 include incoming call reception, message reception, key signal input, touch input, etc. The alarm unit 153 outputs a signal notifying the user of the occurrence of an event in a different form from an audio signal or a video signal. For example, the alarm unit 153 may output a notification signal through vibration. The video signal or the audio signal may be output through the sound output module 152, so that the display unit 151 and the sound output module 152 may be classified as some parts of the alarm unit 153.

The haptic module 154 generates a variety of tactile effects which the user can sense. One typical example of the tactile effects that can be generated by the haptic module 154 is vibration. In a case where the haptic module 154 generates vibration as a tactile effect, the haptic module 154 may change intensity and pattern of generated vibration. For example, the haptic module 154 may combine different vibrations and output the combined vibration, or may sequentially output different vibrations. In addition to vibration, the haptic module 154 may generate various tactile effects, such as a stimulus effect by an arrangement of pins that move perpendicularly to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element.

The haptic module 154 may be implemented so as to allow the user to perceive such effects not only through direct tactile sensation but also through kinesthetic sensation of fingers, arms, or the like of the user. Two or more haptic modules 154 may be provided depending on how the MS 100 is constructed.

The memory 160 may store a program for operating the controller 180, and may temporarily store I/O data (for example, a phonebook, a message, a still image, a moving image, etc.). The memory 160 may store vibration and sound data of various patterns that are output when a user touches the touch screen.

The memory 160 may include a storage medium of at least one type of a flash memory, a hard disk, a multimedia card micro type, a card type memory (for example, SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc. Also, the MS 100 may utilize web storage that performs a storage function of the memory 160 over the Internet.

The interface unit 170 may be used as a path via which the MS 100 is connected to all external devices. The interface unit 170 receives data from the external devices, or receives a power-supply signal from the external devices, such that it transmits the received data and the power-supply signal to each constituent element contained in the MS 100, or transmits data stored in the MS 100 to the external devices. For example, the interface unit 170 may include a wired/wireless headset port, an external charger port, a wired/wireless data port, a memory card port, a port connected to a device including an identification module, an audio I/O port, a video I/O port, an earphone port, and the like.

An identification module is a chip that stores a variety of information for identifying the authority to use the MS 100, and may include a User Identify Module (UIM), a Subscriber Identify Module (SIM), a Universal Subscriber Identity Module (USIM), and the like. A device including an identification (ID) module (hereinafter referred to as an identification device) may be configured in the form of a smart card. Therefore, the ID device may be coupled to the MS 100 through a port.

When the MS 100 is connected to an external cradle, the interface unit 170 may be used as a path through which the connected cradle supplies power to the MS 100 or a path through which a variety of command signals input to the cradle by a user are transferred to the MS 100. The various command signals or the power input from the cradle may function as a signal for enabling the user to perceive that the mobile terminal is correctly mounted in the cradle.

The controller 180 generally controls the operation of each component to control the overall operation of the MS 100. For example, the controller 180 performs control and processing associated with voice communication, data communication, video communication, and the like. The controller 180 may include a multimedia module 181 for multimedia reproduction. The multimedia module 181 may be installed at the interior or exterior of the controller 180.

The controller 180 may perform pattern recognition processing in which written input or drawing input carried out on the touch screen is recognized as a letter or as an image. In addition, the controller may filter either a user-selected region or the remaining regions other than the user-selected region.

The power-supply unit 190 receives an external power-supply signal and an internal power-supply signal under the control of the controller 180, and provides a power-supply signal requisite for operations of the individual constituent elements.

The power-supply unit 190 of the MS according to an embodiment of the present invention includes a primary power-supply unit and a storage unit. That is, the MS 100 according to an embodiment of the present invention includes not only the primary power-supply unit but also an additional storage unit. The storage unit is charged with electricity while MS power consumption does not exceed the limitation of power consumption corresponding to maximum power amount that can be normally supplied from the primary power-supply unit. Thereafter, the MS power consumption exceeds the limitation of power consumption, the storage unit provides power.

Figure 11:
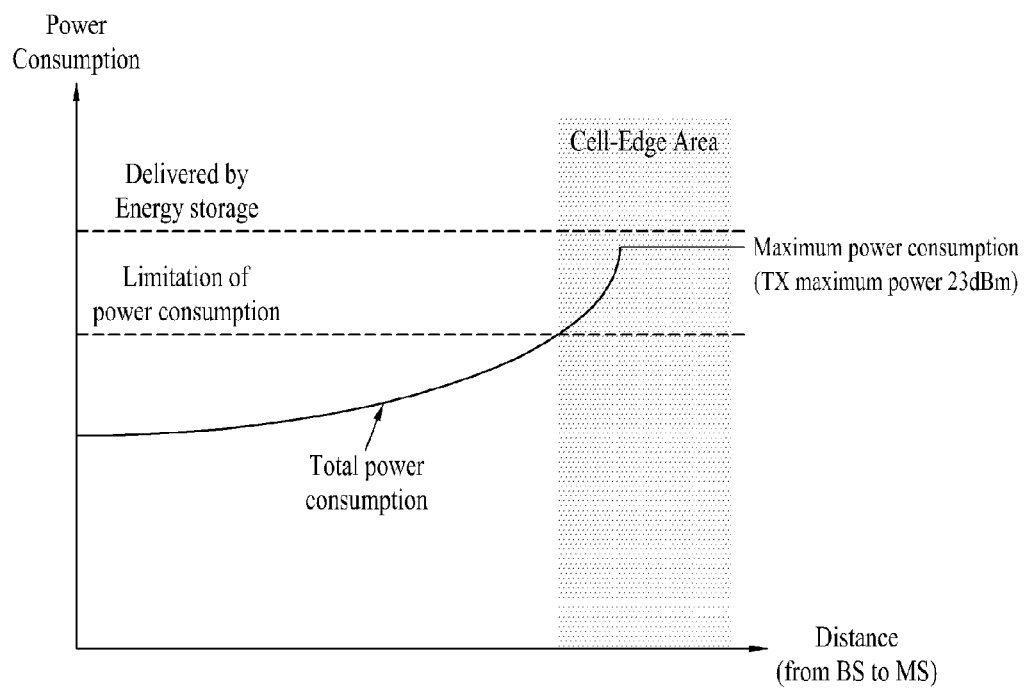
FIG. 11 is a graph illustrating power consumption of a mobile station (MS) according to an embodiment of the present invention.

FIG. 11 is a graph illustrating power consumption of a mobile station (MS) according to an embodiment of the present invention. Referring to FIG. 11, power consumption up to the limitation of power consumption is generated from the primary power-supply unit, and power consumption higher than the limitation of power consumption is generated from the storage unit.

A variety of embodiments to be disclosed in the following description may be implemented in a computer or a computer-readable recording medium by means of software, hardware, or a combination thereof.

In the case of implementing the present invention by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for implementing other functions, etc.

In some cases, embodiments of the present invention may also be implemented as the controller 180.

In the case of implementing the present invention by software, embodiments such as steps and functions to be disclosed in the present invention can be implemented by additional software modules. Each software module may perform one or more functions and operations to be disclosed in the present invention.

Software code can be implemented as a software application written in suitable program languages. The software code may be stored in the memory 160, and may be carried out by the controller 180.

Figure 12:
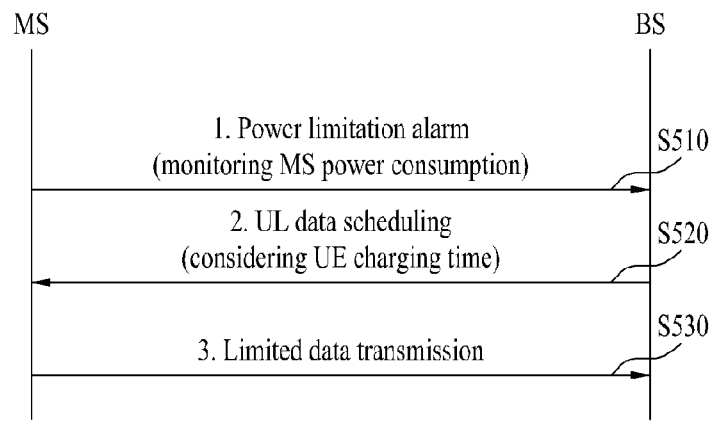
FIG. 12 is a flowchart illustrating a data transmission method according to a first embodiment of the present invention.

A data transmission method according to a first embodiment of the present invention will hereinafter be described with reference to FIG. 12. FIG. 12 is a flowchart illustrating a data transmission method according to a first embodiment of the present invention.

While the MS communicates with the BS, the MS monitors its own power consumption. As soon as the MS power consumption exceeds the limitation of power consumption, the MS informs the BS that the MS power consumption has exceeded the limitation of power consumption (Step S510).

If the BS receives the output signal of the MS and thus recognizes the MS power consumption higher than the limitation of power consumption, the BS generates UL data transmission scheduling information in consideration of a charging time of the MS storage unit, and transmits it to the MS (Step S520). That is, in order to allow the MS not to transmit data during the charging time of the storage unit, the BS generates the UL data transmission scheduling information and transmits it to the MS (Step S520).

As a result, the MS transmits data to the BS according to the UL data transmission scheduling information received from the BS (Step S530).

Figure 13:
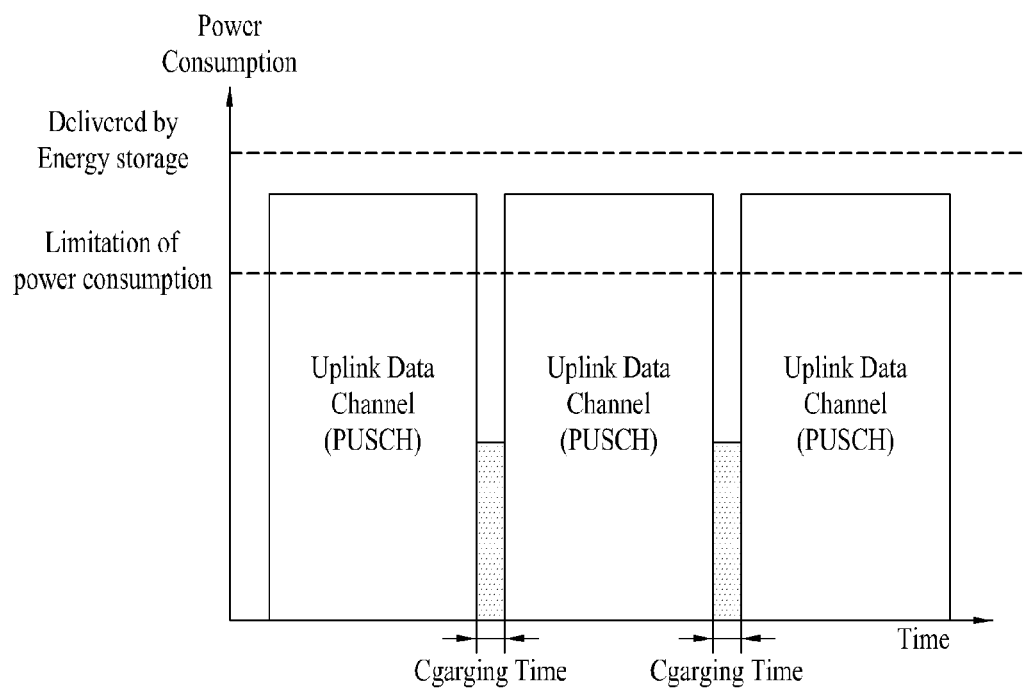
FIG. 13 shows a data transmission format in which a charging time of an MS storage unit is considered according to an embodiment of the present invention.

FIG. 13 shows a data transmission format in which a charging time of an MS storage unit is considered according to an embodiment of the present invention.

Figure 1:
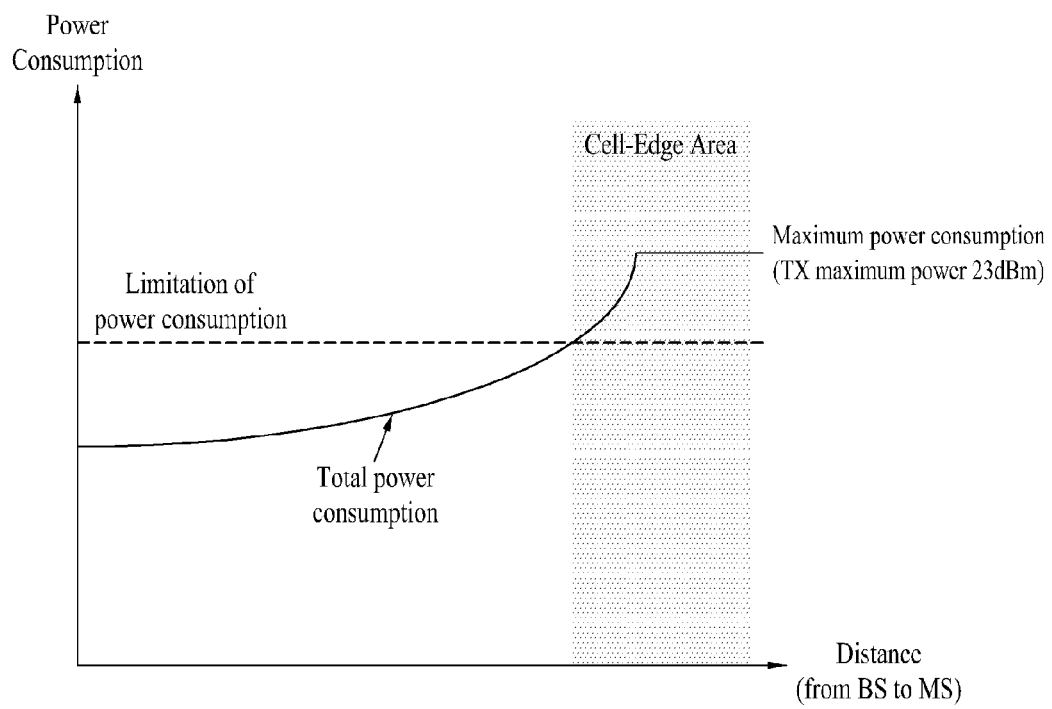
FIG. 1 is a graph illustrating a variation of power consumed by a Long Term Evolution (LTE) User Equipment (UE) which transmits data and/or control information via uplink.
Figure 2:
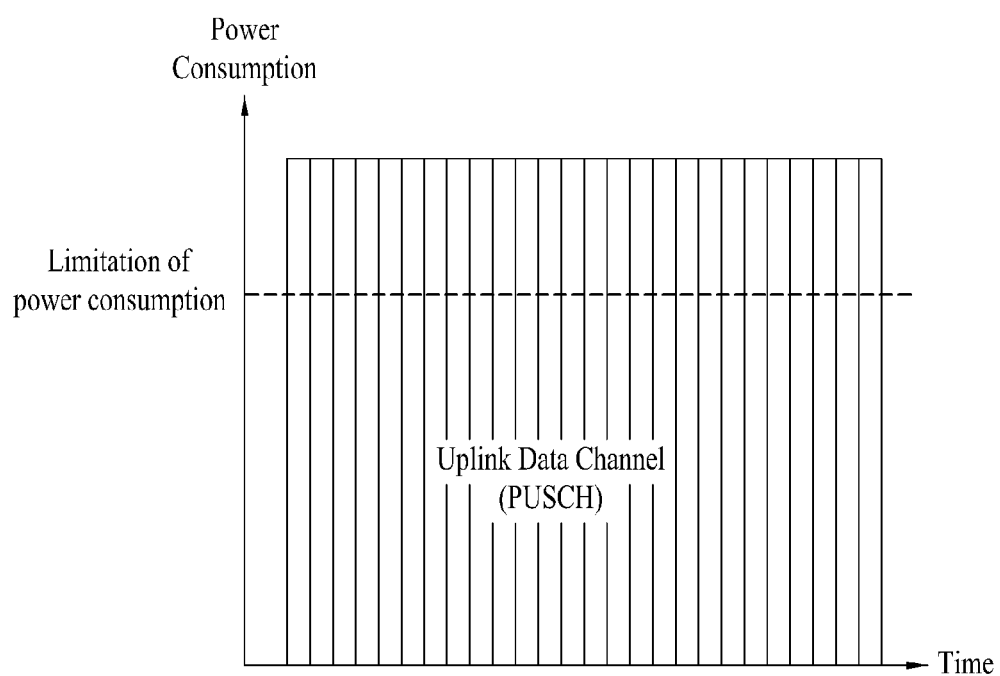
FIG. 2 shows that UL data is transmitted with time in a cell edge region.

According to the related art, the MS has transmitted data with power higher than the limitation of power consumption in almost all times, as shown in FIG. 2. In contrast, according to the present invention, the MS does not transmit data during the charging time of the storage unit That is, during a first time, the MS transmits data with power higher than the limitation of power consumption using the power supplied from the primary power-supply unit and the storage unit. During a second time, the MS charges the storage unit with electricity.

In order to charge the storage unit with electricity, it is necessary for the MS power consumption not to exceed the limitation of power consumption for a predetermined period of time. Therefore, if the MS is located in the cell edge region of the cell, successive data transmission of the MS is limited, and the MS does not transmit data for a predetermined period of time so as to guarantee a minimum charging time. The MS can stably transmit data with the power higher than the limitation of power consumption during the remaining time other than the charging time using the charged power obtained for the charging time.

The LTE system may use a variety of channels for uplink, for example, a Physical Random Access Channel (PRACH) for random access, a Physical Uplink Control Channel (PUCCH) for control information transmission, and a Physical Uplink Shared Channel (PUSCH) for data transmission. In this case, according to not only a data transmission method but also a method for transmitting and constructing a PUSCH defined in the LTE standard, the PUSCH may transmit either information in which control information and data are multiplexed or other information composed of only control information. The control information is considered to be important in a UL or DL coverage balance, a DL feedback, etc. On the other hand, UL data can guarantee integrity of data using a retransmission method and a delayed transmission method, etc. such that the importance of the UL data is lower than that of the control information. Therefore, it is necessary for the control information to be necessarily transmitted at an accurate time. Accordingly, the charging time of the MS storage unit needs to be decided in consideration of a transmission start time point of UL control information.

Thereafter, if it is determined that the MS power consumption is not higher than the limitation of power consumption, the MS informs the BS that the MS power consumption is not higher the limitation of power consumption. As a result, the BS generates UL data transmission scheduling information without considering the charging time of the MS storage unit, and transmits it to the MS. Thereafter, data can be normally communicated between the MS and the BS.

Figure 14:
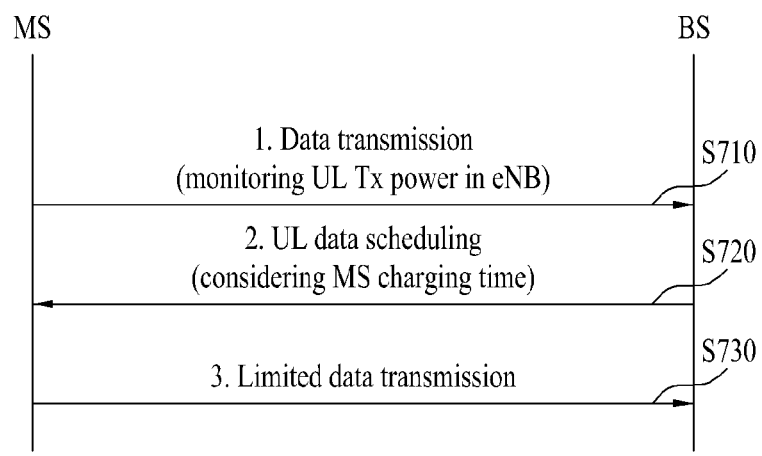
FIG. 14 is a flowchart illustrating a data transmission method according to a second embodiment of the present invention.

A data transmission method according to a second embodiment of the present invention will hereinafter be described with reference to FIG. 14. FIG. 14 is a flowchart illustrating a data transmission method according to a second embodiment of the present invention.

While the BS communicates with the MS, the BS monitors transmission (Tx) power of the MS (Step S710). If the transmission (Tx) power of the MS is higher than a reference value, the BS determines that the MS power consumption is higher than the limitation of power consumption, generates UL data transmission scheduling information in consideration of the charging time of the MS storage unit, and transmits it to the MS (Step S720). That is, the BS generates UL data transmission scheduling so as to prevent the MS from continuously transmitting data.

The MS transmits data to the BS according to the UL data transmission scheduling information received from the BS (Step S730).

In this case, the MS according to a first embodiment of the present invention does not transmit data for the charging time in consideration of the charging time of the storage unit. In other words, during a first time, the MS transmits data with the power higher than the limitation of power consumption using the power supplied from the primary power-supply unit and the storage unit. During a second time, the MS charges the storage unit with electricity.

Thereafter, if the Tx power of the MS monitored by the BS maintains a reference value or less, the BS determines that the MS power consumption is equal to or less than the limitation of power consumption, so that the BS generates UL data transmission scheduling information without considering the charging time of the MS storage unit, and transmits it to the MS. After that, the MS can normally transmit and receive data to and from the BS.

Figure 15:
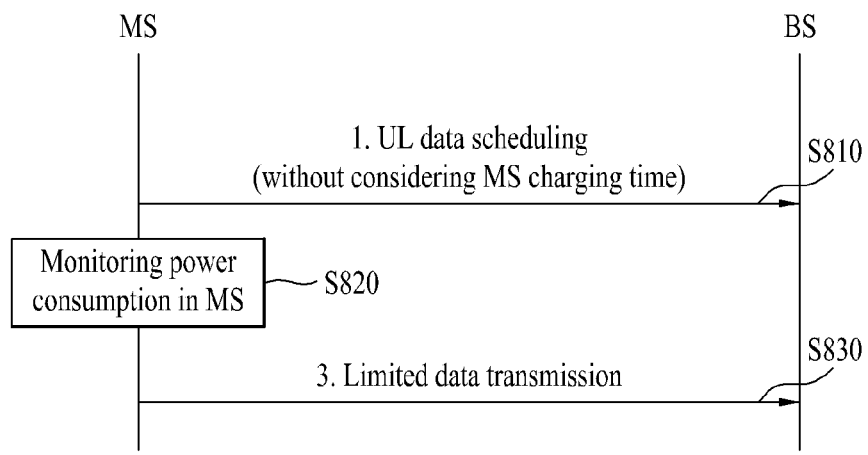
FIG. 15 is a flowchart illustrating a data transmission method according to a third embodiment of the present invention.

A data transmission method according to a third embodiment of the present invention will hereinafter be described with reference to FIG. 15. FIG. 15 is a flowchart illustrating a data transmission method according to a third embodiment of the present invention.

While the MS communicates with the BS, it receives UL data transmission scheduling information from the BS (Step S810), and monitors its own power consumption (Step S820).

If power consumption of the MS is higher than a limitation of power consumption, the MS transmits UL data to the BS in consideration of the charging time of the storage unit, differently from the UL data transmission scheduling information received from the BS (Step S830). That is, during the charging time of the storage unit, although data is to be transmitted during the received UL data transmission scheduling, UL data is not transmitted to the BS.

In other words, during the first time, the MS transmits data with the power higher than the limitation of power consumption using the power supplied from the primary power-supply unit and the storage unit. During the second time, the storage unit of the MS is charged with electricity.

Thereafter, if the power consumption of the MS is less than the limitation of power consumption, the MS transmits UL data to the BS without considering the charging time of the storage unit.

Figure 16:
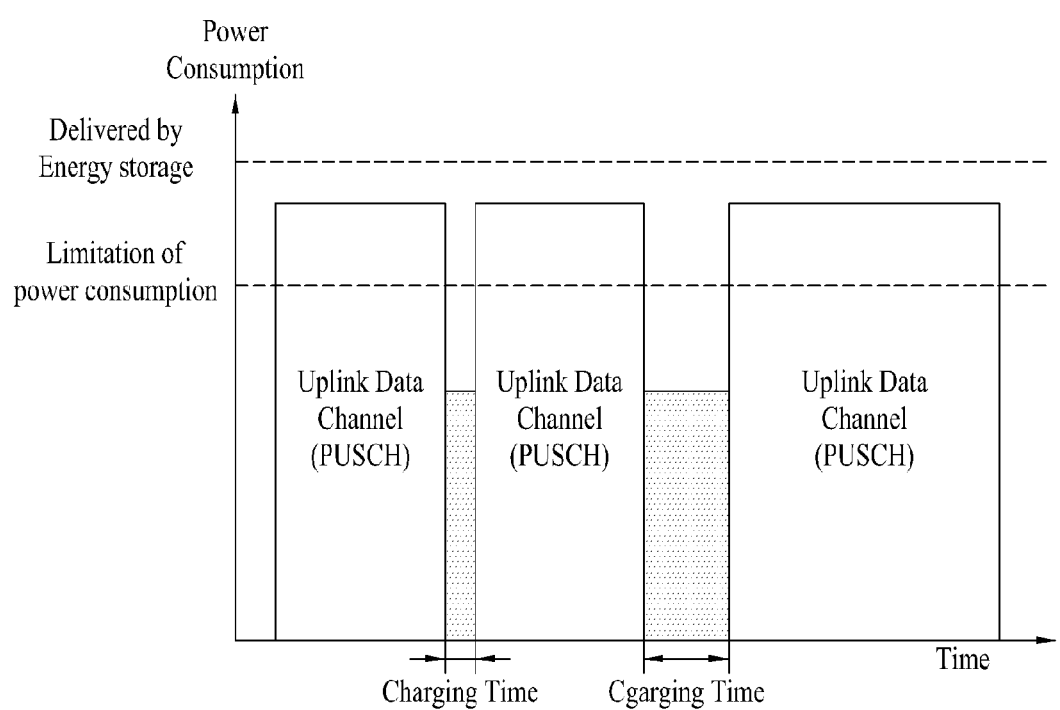
FIG. 16 is a graph illustrating that a successive data transmission time of the MS is changed by diversifying a charging time of the MS storage unit.

FIG. 16 is a graph illustrating that a successive data transmission time of the MS is changed by diversifying a charging time of the MS storage unit. Referring to FIG. 16, the successive data transmission time of the MS may be differently established according to individual charging times. In FIG. 16, a first charging time is short, and a second charging time is long. If the charging time is long, much more power can be charged in the storage unit, so that the MS can successively transmit data with the power higher than the limitation of power consumption for much longer time. Therefore, the charging time is established in various ways according to individual conditions, so that data transmission of the MS can be adjusted.

Figure 17:
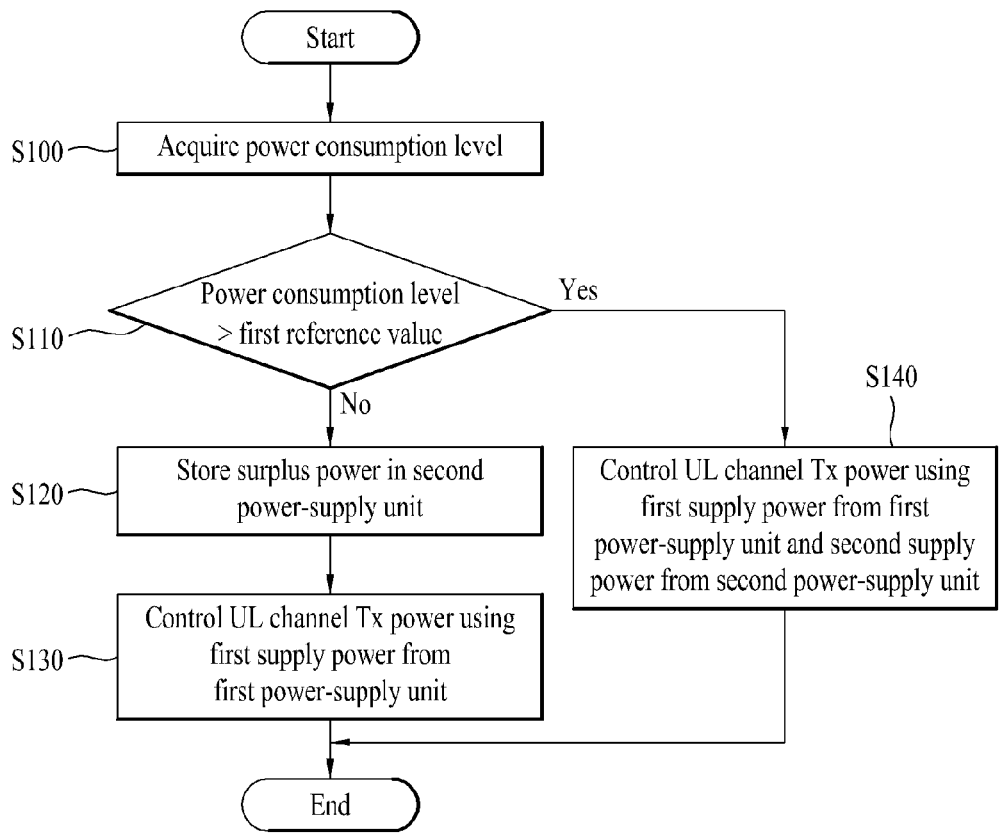
FIG. 17 is a flowchart illustrating a method for controlling UL transmission power according to a fourth embodiment of the present invention.
Figure 18:
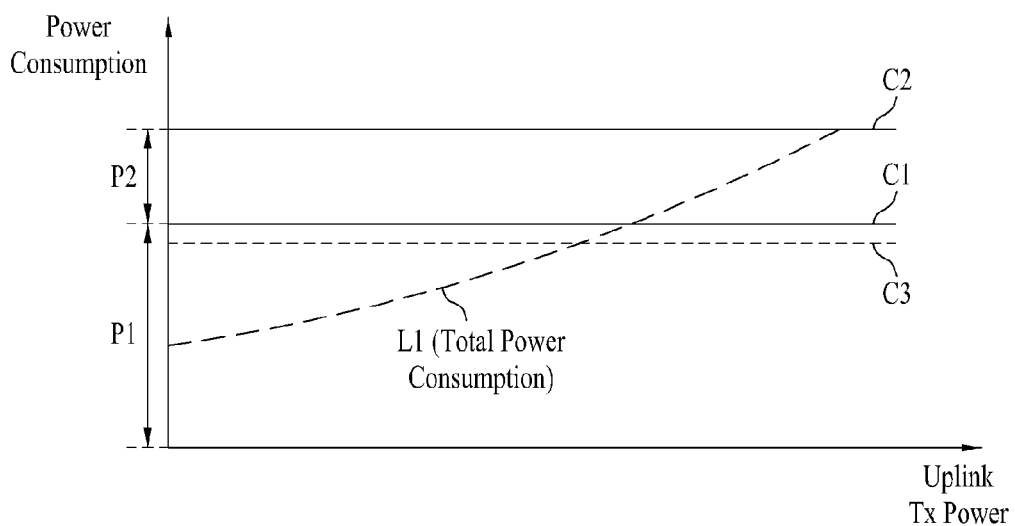
FIGS. 18 and 19 are graphs illustrating a method for controlling UL transmission power according to a fourth embodiment of the present invention.
Figure 19:
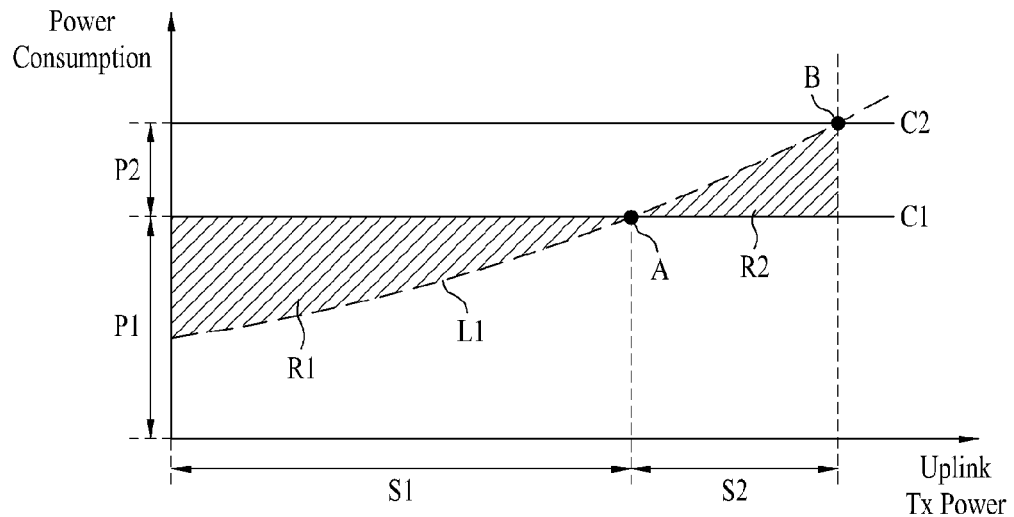

FIG. 17 is a flowchart illustrating a method for controlling UL transmission power according to a fourth embodiment of the present invention. FIGS. 18 and 19 are graphs illustrating a method for controlling UL transmission power according to a fourth embodiment of the present invention.

A method for controlling UL transmission power according to a fourth embodiment of the present invention can be implemented in the wireless communication system and the MS 100 shown in FIGS. 3 to 6. The method for controlling UL transmission power and the operations of the MS 100 according to a fourth embodiment of the present invention will hereinafter be described with reference to the accompanying drawings.

Referring to FIG. 17, the controller 160 obtains a power consumption level (Step S100). The power consumption level may include a current power consumption level that is now being used by the MS 100, and a power consumption level to be used within a predetermined time.

Power consumption of the MS can be divided into three kinds of power consumption.

A first power consumption is required for driving an electronic circuit for maintaining a stable state of the MS 100. A second power consumption is required for decoding a signal received via a downlink. A third power consumption is required for amplifying a Tx signal so as to transmit signal via an uplink.

In this case, power consumption required not only for the electronic circuit but also for the decoding is not greatly changed in all operations satisfying the LTE standard. However, power consumption required for amplifying the Tx signal is greatly changed according to UL transmission power (defined as a maximum of 23 dBm in case of the LTE system).

In FIG. 18, a horizontal axis indicates UL transmission power, and a vertical axis indicates power consumption of the MS 100.

In FIG. 18, P1 (or C1) indicates a first supply power provided from the first power-supply unit 120, P2 indicates a second supply power provided from the second power-supply unit 130, and L2 indicates a power consumption level of the MS 100.

FIG. 18 is a graph illustrating variation of power consumption generated when the LTE MS 100 transmits UL data and/or control information.

The MS 100 transmits data and/or control information to the BS 11 using the Tx power commanded by an agreement between the MS 100 and the BS 11. As the UL transmission power transmitted from the BS 11 to the MS 100 is increased, total power consumption L1 is also increased.

The controller 160 determines whether the acquired power consumption level L2 is higher than a first reference value (Step S110).

The first reference value may be established in various ways. For example, the first reference value may be the first supply power (C1 in FIG. 18). In this case, the controller 160 can determine whether the acquired power consumption level L2 is higher than the first supply power P1.

For example, the first reference value may be a first power level (C3 in FIG. 18) less than the first supply power. In this case, the controller 160 can determine whether the acquired power consumption level L1 is higher than the first power level C3.

In the following description, it is assumed that the first reference value is identical to the first supply power (C1 or P1).

If the acquired power consumption level L1 is not higher than the first reference value in step S110, the controller 160 stores the surplus power other than the power consumption among the first supply power P1 received from the first power-supply unit 120 in the second power-supply unit 130 (Step S120).

Referring to FIG. 19, the point 'A' indicates an exemplary case in which the first reference value C1 is identical to the obtained power consumption level L1.

Referring to FIG. 19, the first period S1 indicates an exemplary case in which the acquired power consumption level L1 is not higher than the first reference value. The first region R1 represents the surplus power stored in the second power-supply unit 130 in the first interval S1.

That is, the surplus power corresponding to the first region R1 in FIG. 19 may be stored in the second power-supply unit 130.

If the acquired power consumption level L2 is not higher than the first reference value, the controller 160 stores the surplus power in the second power-supply unit 130, and at the same time controls Tx power of a UL channel using the first supply power (Step S130).

If the acquired power consumption level L2 is higher than the first reference value in step S110, the controller 160 controls the UL channel Tx power using the first supply power received from the first power supply unit 120 and the second supply power received from the second power-supply unit 130 (Step S140).

Referring to FIG. 19, the point 'B' indicates a maximally allowed value of a level of power consumed by the MS 100. That is, the level of power consumed by the MS 100 is equal to or less than the sum of the first supply power P1 and the second supply power P2.

If the level of power consumed by the MS 100 is about to exceed the first supply power P1 and the second supply power P2, the controller 160 can control the level of power consumption of the MS 100 not to exceed the sum of the first supply power P1 and the second supply power P2.

Referring to FIG. 19, if the acquired power consumption level L1 corresponds to the second interval S2, the controller 160 can control Tx power of a UL channel using both the first supply power P1 and the second supply power P2.

In FIG. 19, the second region R2 indicates the second supply power supplied from the second power-supply unit 130.

When controlling the UL channel Tx power using both the first supply power P1 and the second supply power P2, the controller 160 may control the UL channel Tx power under a predetermined condition.

For example, the controller 160 may selectively perform the operation of step S140 according to categories of information transmitted over the UL channel.

Tx information category may be established in various ways.

For example, when transmitting control information over the UL channel, the controller 160 may perform the operation of step S150.

As described above, in the 3GPP LTE system, the control information may be transmitted over a PUCCH or a PUSCH. For example, if control information is transmitted over the PUCCH, the operation of step S140 may be carried out. In another example, if data and control information are transmitted over the PUCCH or if control information is transmitted over the PUSCH, the operation of step S140 may be carried out.

If information to which the retransmission (e.g., HARQ) scheme or the delayed transmission scheme is not applied is transmitted over the UL channel, the operation of step S140 may be carried out.

In the 3GPP LTE system, if data transmitted from the MS 100 to the BS 11 is lost, the BS 11 may ask the MS 100 to retransmit the lost data. However, if control information transmitted from the MS 100 to the BS 11 is lost, the BS 11 may not ask the MS 100 to retransmit the lost control information.

As described above, after information has been lost, if information that the BS 11 does not ask the MS 100 to retransmit the lost information is transmitted over the UL channel, the controller 160 may perform the operation of step S140.

Therefore, information (such as control information) to which the retransmission scheme is not applied can be more stably transmitted because the second supply power is adapted to control the UL transmission power.

For example, if information selected by a user is transmitted over the UL channel, the controller 160 may perform the operation of step S140.

The controller 160 may transmit various data over the UL channel. In this case, in relation to data to be significantly conducted by the user from among data types to be transmitted to the BS 11 over the UL channel, the controller 160 may control the UL transmission power using both the first supply power and the second supply power.

The controller 160 may provide a user interface UI for selecting data or information to which the operation S140 is to be applied.

If the MS 100 implemented as a data card is mounted to another MS such as a computer through a USB, the user interface UI may be provided to another MS by the controller 160 or may be displayed on a display of the another MS. Alternatively, the user interface (UI) may also be provided from another MS and then displayed.

The user may select a specific application or specific data as information to which the operation S140 is to be applied.

For example, the user may select an E-mail client or E-mail. If the controller 160 transmits the E-mail through the UL channel, it may perform the operation S140.

In addition, the controller 160 may selectively perform the operation S140 according to UL channel categories.

For example, if the controller 160 transmits information over a PUCCH or a PUSCH, that can be adapted to transmit the control information, from among UL channels of the 3GPP LTE system, the controller 160 may control Tx power of the UL channel using both the first supply power and the second supply power.

Figure 20:
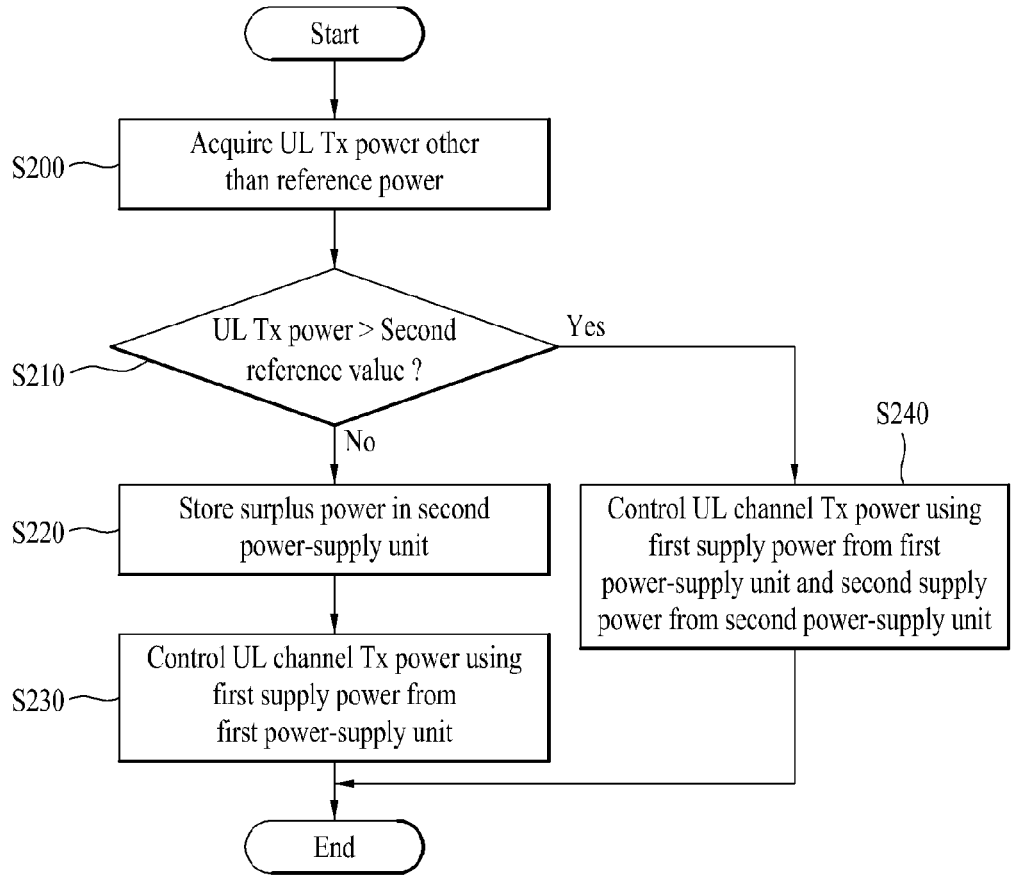
FIG. 20 is a flowchart illustrating a method for controlling UL transmission power according to a fifth embodiment of the present invention.
Figure 21:
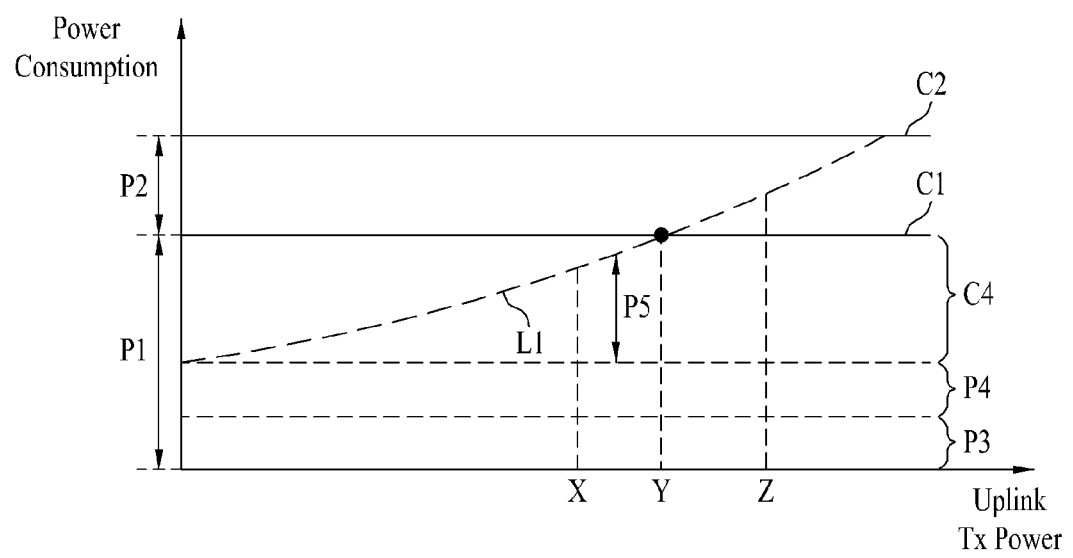
FIG. 21 is a graph illustrating a method for controlling UL transmission power according to a fifth embodiment of the present invention.

FIG. 20 is a flowchart illustrating a method for controlling UL transmission power according to a fifth embodiment of the present invention. FIG. 21 is a graph illustrating a method for controlling UL transmission power according to a fifth embodiment of the present invention.

A method for controlling UL transmission power according to a fifth embodiment of the present invention may be implemented in the wireless communication system and the MS 100 with reference to FIGS. 3 to 6. The method for controlling UL transmission power and the operations of the MS 100 according to a fifth embodiment of the present invention will hereinafter be described with reference to the accompanying drawings.

Referring to FIG. 10, the controller 160 acquires a reference power decided by a certain reference and UL transmission power consumed for UL channel transmission (Step S200).

UL transmission power consumed for the UL channel transmission may include a current power consumption level that is now being used by the MS 100, and a power consumption level to be used for the UL channel transmission within a predetermined time.

The reference power may include first power required for driving a communication module and second power required for decoding data received over a DL channel. The communication module may correspond to the wireless communication unit 110.

The reference power may include power consumed for driving an electronic circuit that maintains a stable state of the MS 100. The electronic circuit may include not only the communication module but also other circuits.

The controller 160 determines whether the acquired UL transmission power is higher than a second reference value (Step S210).

FIG. 21 is a graph similar to those of FIGS. 18 and 19 according to a fifth embodiment of the present invention.

Reference numbers shown in FIG. 21 are identical to those of FIGS. 18 and 19.

In FIG. 21, P3 indicates a power required for driving either the communication module or the electronic circuit, and P4 indicates a power required for decoding a DL channel. Namely, in FIG. 21, the sum of P3 and P4 is identical to the reference power.

On the line L1, a power value P5 other than the sum of P3 and P4 may correspond to the UL transmission power.

The second reference value may be established in various ways. In FIG. 21, the second reference value may correspond to C4. That is, the second reference value C4 in FIG. 21 may be the remainder calculated when the sum of P3 and P4 is excluded from the first supply power P1. The P3 and P4 values are not greatly changed, but may be changed according to a condition, so that the second reference value C4 may also be changed with time.

If the acquired UL transmission power is not higher than the second reference value C4 in step S910, the controller 160 stores the surplus power other than the power consumption among the first supply power P1 received from the first power-supply unit 120 in the second power-supply unit 130 (Step S220). The operation of step S220 may correspond to the operation of step S120 shown in the fifth embodiment of the present invention.

If the acquired UL transmission power is not higher than the second reference value C4, the controller 160 stores the surplus power in the second power-supply unit 130, and controls the UL channel transmission power using the first supply power (Step S230). The operation of step S230 may correspond to the operation of step S130 shown in the fourth embodiment.

If the acquired UL transmission power is higher than the second reference value C4 in step S210, the controller 160 may control the UL channel transmission power using the first supply power P1 received from the first power-supply unit 120 and the second supply power P2 received from the second power-supply unit 130 (Step S240). The operation of step S240 may correspond to the operation of step S140 shown in the fifth embodiment of the present invention.

Referring to FIG. 21, if a current condition is a condition of the point X, the controller 160 may store the surplus power in the second power-supply unit 130. In addition, if a current condition is a condition of the point Z, the controller 160 may control the UL channel transmission power using both the first supply power and the second supply power. In FIG. 21, the power for the second power-supply unit 130 is stored at the point Y, and the use of the power supplied from the second power-supply unit 130 diverge from the point Y.

Although P2 is constantly depicted in FIGS. 18, 19 and 21, the scope or spirit of the present invention is not limited thereto and can be applied to other examples as necessary. The level of P2 may be changed with time.

As described above, power may be stored in the second power-supply unit 130 according to a changed condition, or the stored power may be used as Tx power of the UL channel. Therefore, the level of P2 may be changed according to a condition or time.

A method for controlling UL transmission power according to the above-mentioned embodiments of the present invention may be implemented as a computer-readable code stored in a recording medium including a program. In the aforementioned implementation by software, constituent elements of the present invention are code segments for carrying out necessary tasks or operations. Programs and code segments may be stored in a processor-readable medium, or may be transmitted by a computer data signal combined with carrier waves in a transmission medium or a communication network.

The computer-readable recording medium may include all kinds of recording devices, each of which stores data readable by a computer system. For example, the computer-readable recording medium may be a ROM, a RAM, a CD-ROM, a DVD±ROM, a DVD-RAM, a magnetic tape, a floppy disc, a hard disc, an optical-data storage unit, or the like. The computer-readable recording medium can be distributed over a plurality of computer systems connected to a network so that computer-readable code is written thereto and executed therefrom in a decentralized manner.

As apparent from the above description, the exemplary embodiments of the present invention have the following effects.

The present invention can enable the UE to be stably operated although total power consumption of the UE is higher than a 'limitation of power consumption' line using not only a primary power-supply device but also an additional storage unit. The present invention controls and utilizes a plurality of power-supply units, so that the improvement of a predetermined-level wireless communication service can be guaranteed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting data by a mobile station of a wireless communication system, the method comprising:
   transmitting, if power consumption of the mobile station is higher than a limitation of power consumption, notification information to a base station, the notification information indicating that power consumption of the mobile station is higher than the limitation of power consumption;
   receiving uplink data transmission scheduling generated using the notification information, from the base station;
   transmitting, if power consumption of the mobile station is higher than the limitation of power consumption, first data to the base station with power higher than the limitation of power consumption using power supplied from a primary power-supply unit and a storage unit during a first time according to the received uplink data transmission scheduling; and
   charging the storage unit using the primary power-supply unit during a second time,
   wherein the limitation of power consumption indicates maximum power amount capable of being normally supplied from the primary power-supply unit.

2. The method according to claim 1, further comprising:
   receiving uplink data transmission scheduling from the base station,
   wherein the base station monitors transmission power of the mobile station and determines that the power consumption of the mobile station is higher than the limitation of power consumption when the monitored transmission power is higher than a predetermined reference value, and generates the uplink data transmission scheduling in consideration of a charging time of the storage unit.

3. The method according to claim 1, wherein the second time is decided in consideration of a transmission time of uplink control information.

4. The method according to claim 1, further comprising:
   transmitting second data to the base station with power higher than the limitation of power consumption using power supplied from the primary power-supply unit and the storage unit during a third time; and
   charging the storage unit during a fourth time,
   wherein the fourth time is different from the second time.

5. A method for receiving data by a base station of a wireless communication system, the method comprising:
   receiving notification information from the mobile station, the notification information indicating that power of the mobile station is higher than a limitation of power consumption; and
   generating uplink data transmission scheduling using the received notification information;
   transmitting the uplink data transmission scheduling to a mobile station; and
   receiving no data during a first time and receiving data transmitted with power higher than the limitation of power consumption of the mobile station using power supplied from a primary power-supply unit of the mobile station and a storage unit of the mobile station during a second time according to the uplink data transmission scheduling,
   wherein the limitation of power consumption indicates maximum power amount capable of being normally supplied from the primary power-supply unit of the mobile station, and the first time indicates a charging time of the storage unit.

6. The method according to claim 5, further comprising:
   monitoring transmission power of the mobile station; and
   determining that power consumption of the mobile station is higher than the limitation of power consumption when the monitored transmission power is higher than a predetermined reference value, and generating the uplink data transmission scheduling in consideration of a charging time of the storage unit.

7. The method according to claim 5, wherein the second time is decided in consideration of a transmission time of uplink control information.

8. The method according to claim 5, further comprising:
   receiving no data during a third time and receiving data transmitted with power higher than the limitation of power consumption of the mobile station using power supplied from the primary power-supply unit of the mobile station and the storage unit of the mobile station during a fourth time according to the uplink data transmission scheduling,
   wherein the third time is different from the first time.

9. A mobile station for use in a wireless communication system, the mobile station comprising:
   a wireless communication unit configured to communicate with a base station;
   a primary power-supply unit configured to provide a power required for operating of the mobile station;
   a storage unit that is charged using power of the primary power-supply unit when power consumption of the mobile station is equal to or less than a limitation of power consumption; and
   a controller configured to:
      if the power consumption of the mobile station is higher than the limitation of power consumption, control the wireless communication unit to transmit notification information to a base station, the notification information indicating that power consumption of the primary power-supply unit is higher than the limitation of power consumption;
      receive uplink data transmission scheduling generated using the notification information from the base station via the wireless communication unit;
      if the power consumption of the mobile station is higher than the limitation of power consumption, control the wireless communication unit to transmit first data to the base station with power higher than the limitation of power consumption using power supplied from the primary power-supply unit and the storage unit during a first time according to the received uplink data transmission scheduling; and
      control the primary power-supply unit to charge the storage unit during a second time,
   wherein the limitation of power consumption indicates maximum power amount capable of being normally supplied from the primary power-supply unit.

* * * * *